(12) United States Patent
Hondo et al.

(10) Patent No.: US 7,637,755 B2
(45) Date of Patent: Dec. 29, 2009

(54) DATA PROTECTING APPARATUS AND DATA PROTECTING METHOD

(75) Inventors: Asaya Hondo, Chiba (JP); Toshimasa Matsuoka, Saitama (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 11/866,681

(22) Filed: Oct. 3, 2007

(65) Prior Publication Data

US 2008/0320608 A1 Dec. 25, 2008

(30) Foreign Application Priority Data

Oct. 11, 2006 (JP) ............................. P2006-277873

(51) Int. Cl.
*H01R 13/44* (2006.01)
(52) U.S. Cl. ...................... 439/142; 439/911
(58) Field of Classification Search ................. 439/142, 439/138, 911, 341, 376; 200/1 B
See application file for complete search history.

(56) References Cited

U.S. PATENT DOCUMENTS

| | | | | |
|---|---|---|---|---|
| 5,097,392 | A * | 3/1992 | Tanaka et al. ................ 361/725 |
| 5,199,888 | A * | 4/1993 | Condra et al. ................ 439/142 |
| 5,574,625 | A * | 11/1996 | Ohgami et al. .......... 361/679.09 |
| 5,738,536 | A * | 4/1998 | Ohgami et al. .............. 439/142 |
| 6,705,688 | B2 * | 3/2004 | Tobishima ................ 312/223.1 |
| 6,952,343 | B2 * | 10/2005 | Sato ........................ 361/679.57 |
| 2001/0036763 | A1 * | 11/2001 | Funatsu ....................... 439/341 |
| 2001/0045299 | A1 * | 11/2001 | Miyamoto et al. ............. 174/66 |
| 2004/0055858 | A1 * | 3/2004 | Hoffman ................... 200/61.62 |
| 2004/0147947 | A1 * | 7/2004 | Donofrio ..................... 606/169 |

FOREIGN PATENT DOCUMENTS

| | | |
|---|---|---|
| JP | 2002-184164 | 6/2002 |
| JP | 2004-21669 | 1/2004 |
| JP | 2004-214973 | 7/2004 |
| JP | 2006-62156 | 3/2006 |

* cited by examiner

*Primary Examiner*—T C Patel
*Assistant Examiner*—Harshad C Patel
(74) *Attorney, Agent, or Firm*—Oblon, Spivak, McClelland, Maier & Neustadt, L.L.P.

(57) ABSTRACT

In a vehicle audio apparatus, the detection switch is turned off when the lock claw is released from the lock-claw holder to open the front panel. The bi-directional switches are thereby turned off, disconnecting the data lines SD+ and SD− between the USB interface unit of the main unit and the USB socket of the front panel. Thereafter, the front panel is opened, releasing the connector (22) from the connector 13 and ultimately disconnecting the power-supply lines (VBUS and GND). Hence, the vehicle audio apparatus is prevented from being abruptly disconnected from the power supply. This prevents the data stored in the USB memory from being destroyed.

8 Claims, 15 Drawing Sheets

TOP VIEW

FRONT VIEW

SIDE VIEW

NATURAL STATE

BENT STATE

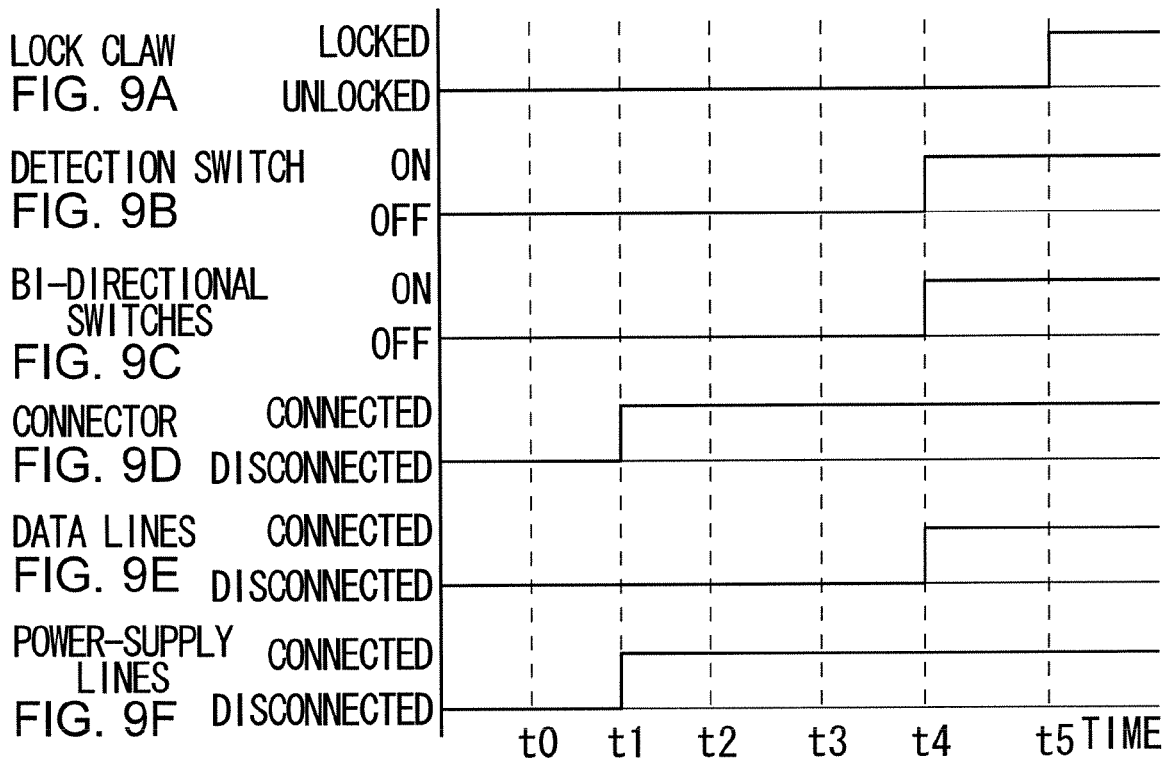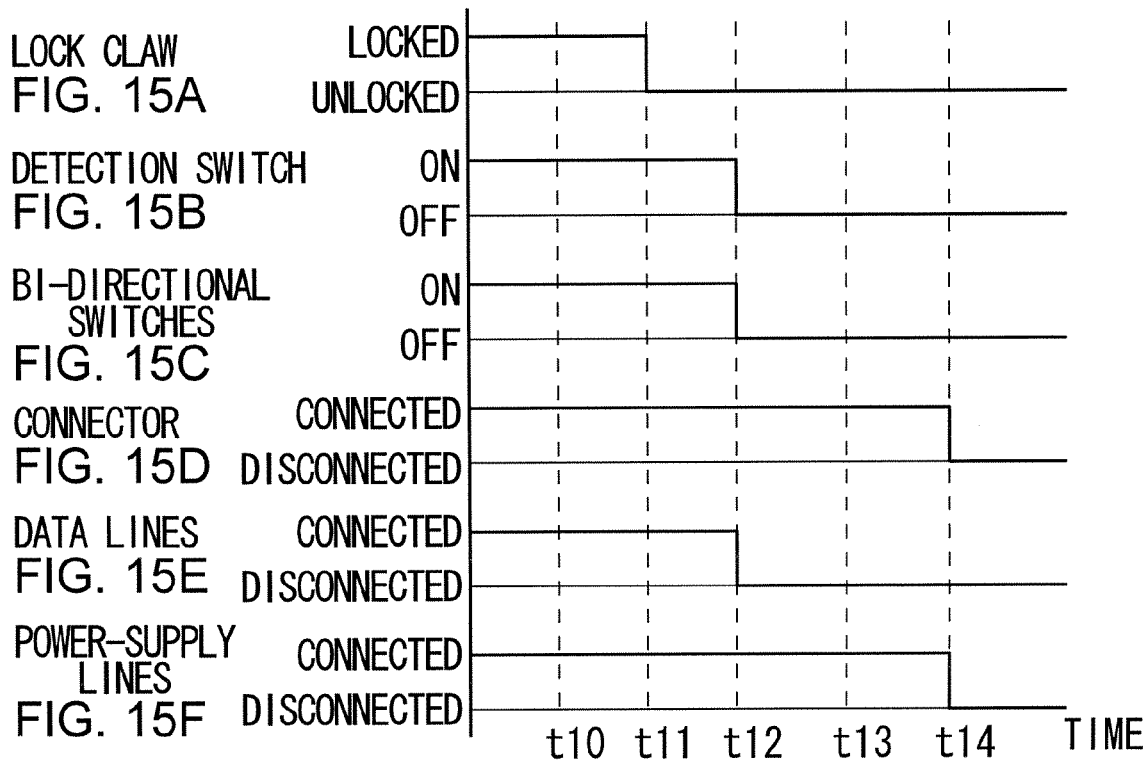

DATA PROTECTING APPARATUS AND DATA PROTECTING METHOD

CROSS REFERENCES TO RELATED APPLICATIONS

The present invention contains subject matter related to Japanese Patent Application JP2006-277873 filed in the Japanese Patent Office on Oct. 11, 2006, the entire contents of which being incorporated herein by reference.

BACKGROUND OF THE INVENTION

1. Field of the Invention

The present invention relates to a data protecting apparatus and a data protecting method, and is useful when applied to a vehicle audio apparatus to be mounted in, for example, vehicles.

2. Description of the Related Art

Vehicle audio apparatuses have been widely used. Each vehicle audio apparatus is mounted on, for example, the dashboard of a vehicle (not shown). As it is operated by a user, the vehicle audio apparatus receives broadcast radio programs or plays back Compact Discs (CDs), thus acquiring audio data. The audio data is supplied to speakers, which generate a sound, to which the user may listen.

Most vehicle audio apparatuses are configured to have a size defined by Deutsche Industrie Normen (DIN) so that they may be used in both vehicles and audio systems. More precisely, the vehicle audio apparatuses have width of 178 mm and height of 50 mm. (Hereinafter, this size will be referred to as DIN size.)

It is demanded that the vehicle audio apparatus should have a front panel of DIN size, on which a number of operation buttons and a large display panel are provided so that the apparatus may perform many functions and displays a large image easy to see.

A type of an audio apparatus has been proposed, which has a front panel that can be opened and closed. While the front panel remains opened, a CD (having a diameter of about 120 mm and a thickness of about 1.2 mm) can be inserted into the main unit of the vehicle audio apparatus. (See, for example, Jpn. Pat. Appln. Laid-Open Publication No. 2002-184164.)

In order to achieve electrical connection between the front panel and main unit of a vehicle audio apparatus, contact-type connection terminals may be provided, one of the back of the front panel, and the other on the front of the main unit. The connection terminals, if so arranged, physically move from each other when the front panel is opened. Consequently, the front panel and the main unit are electrically disconnected from each other.

SUMMARY OF THE INVENTION

In recent years, so-called USB memories, each incorporating a nonvolatile semiconductor memory and having a Universal Serial Bus (USB) connector, have come into wide use as media for storing data.

The USB memory operates, using power supplied through the USB connector. From the USB memory, any desired data can be read.

It is demanded that the vehicle audio apparatus should have a USB socket in order to play back music data of MP3 (Motion Pictures Expert Group-1 Layer-3) format, stored in UBS memories. To facilitate the use of the vehicle audio apparatus, it is proposed that the USB socket be provided on the front panel. If so provided, the USB memory can be easily removed from the vehicle audio apparatus.

Before the USB memory is removed from the vehicle audio apparatus, it is disconnected in a prescribed sequence in order to protect the data stored in it.

If the front panel of the vehicle audio apparatus is opened, with the USB memory connected to the USB socket, the front panel will be electrically disconnected from the main unit of the vehicle audio apparatus. Consequently, the supply of power from the vehicle audio apparatus to the USB memory is abruptly stopped. This may destroy the data stored in the USB memory.

The present invention has been made in view of the foregoing. The present invention is to provide a data protecting apparatus and a data protecting method, which can protect data stored in an external storage device that operates with power supplied to it.

A data protecting apparatus according to the embodiment of the present invention includes: an opening/closing unit that assumes a closed state or an opened state when rotated around a predetermined axis with respect to a main unit, the opening/closing unit being secured to the main unit while remaining in the closed state and being released from the main unit while remaining in the opened state; a movable locking member that is moved with respect to the main unit or the opening/closing unit, and locks the opening/closing unit to the main unit, thereby setting the opening/closing unit in the closed state, or releases the opening/closing unit from the main unit, thereby setting the opening/closing unit in the opened state; main-unit terminals that are provided in the main unit, for connecting the main unit to the opening/closing unit; opening/closing-unit terminals that are provided in the opening/closing unit, to be electrically connected to the main-unit terminals while the opening/closing unit remains in the closed state, and to be electrically disconnected from the main-unit terminals while the opening/closing unit remains in the opened state; an external-apparatus socket that is provided in the opening/closing unit, for supplying power and transmitting data to an external apparatus while the external apparatus remains connected to the external-apparatus socket; an interlock member that operates when the movable locking member is moved; and data-communications switches that electrically disconnect data-communications lines before electrically disconnecting power-supply lines connecting the external-apparatus socket to the main unit, by disconnecting the opening/closing-unit terminals from the main-unit terminals when the opening/closing unit is detected to be shifting from the closed state to the opened state as the interlock member operates in interlock with the movable locking member.

Thus, when the opening/closing unit is opened, it is detected that the movable locking member is moved, before the opening/closing-unit terminals are disconnected from the main-unit terminals. Therefore, the data-communications lines can be disconnected while power is being supplied from the main unit to the external-apparatus socket. Hence, the process of disconnecting the supply of power to the external apparatus can be initiated.

A data protecting method according to the embodiment of the present invention is designed for use in an electronic apparatus which includes, an opening/closing unit configured to rotate around a predetermined axis with respect to a main unit, main-unit terminals provided in the main unit, and opening/closing-unit terminals provided in the opening/closing unit and arranged in association with the main-unit terminals, respectively, and in which the main-unit terminals and the opening/closing-unit terminals electrically connect or disconnect the opening/closing unit or from the main unit. The method includes: a detecting step of detecting that a predetermined movable locking member has been moved to shift the opening/closing unit shift from a closed state in the which the opening/closing unit is secured to the main unit, to an opened state in which the opening/closing unit is released from the main unit, in accordance with a motion of an interlock member that operates when the movable locking member is moved; and a data-communication terminating step of electrically disconnecting data-communications lines, prior to power-supply lines, from a external-apparatus socket provided in the opening-closing unit to connect an external apparatus to the main unit, in accordance with a result of detection performed in the detecting step, before the main-unit terminals and the opening/closing-unit terminals are disconnected, the data-communications lines and the power-supply lines being connected to the main unit by the main-unit terminals and the opening/closing-unit terminals.

Thus, when the opening/closing unit is opened, it is detected that the movable locking member is moved, before the opening/closing-unit terminals are disconnected from the main-unit terminals. Therefore, the data-communications lines can be disconnected while power is being supplied from the main unit to the external-apparatus socket. Hence, the process of disconnecting the supply of power to the external apparatus can be initiated.

According to the present invention, it is possible to achieve a data protecting apparatus and data protecting method which can perform the process of preparing stopping the supply of power to the external apparatus so as to protect data stored in an external storage apparatus that receives power supply for operation, since it is possible to detect that the movable locking member has been moved before the main-unit terminals and the opening/closing-unit terminals are disconnected, when the opening/closing unit is shifted from a closed state to an open state, in order to electrically disconnect the data-communications lines first while power is being supplied from the main unit to the external-apparatus socket.

BRIEF DESCRIPTION OF THE DRAWINGS

FIGS. 9A to 9F are a timing chart illustrating how various components undergo changes while the front panel is being closed;

FIGS. 15A to 15F are a timing chart illustrating how various components undergo changes while the front panel is being opened;

DETAILED DESCRIPTION OF THE PREFERRED EMBODIMENTS

An embodiment of the present invention will be described with reference to the accompanying drawings.

(1) Configuration of the Vehicle Audio Apparatus (1-1) Outer Configuration

Figure 1A:
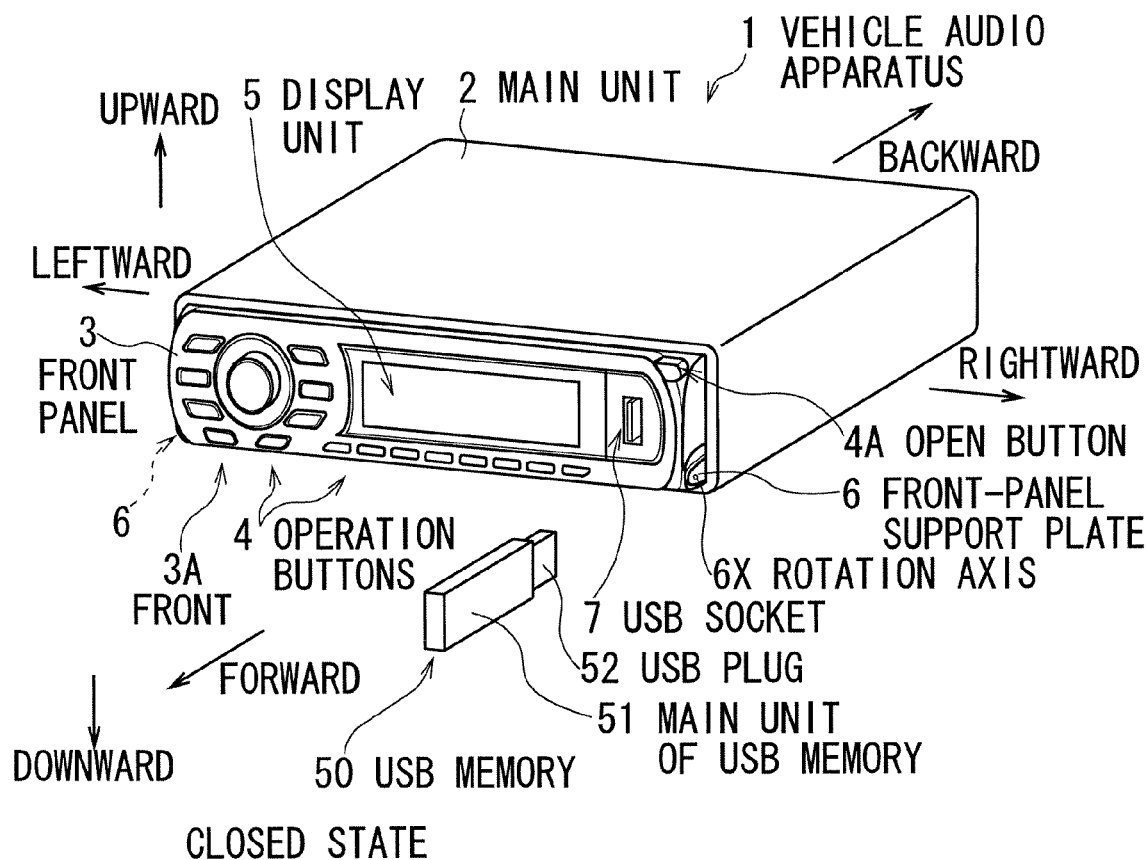
FIGS. 1A and 1B are schematic perspective views showing the outer configuration of a vehicle audio apparatus.
Figure 1B:
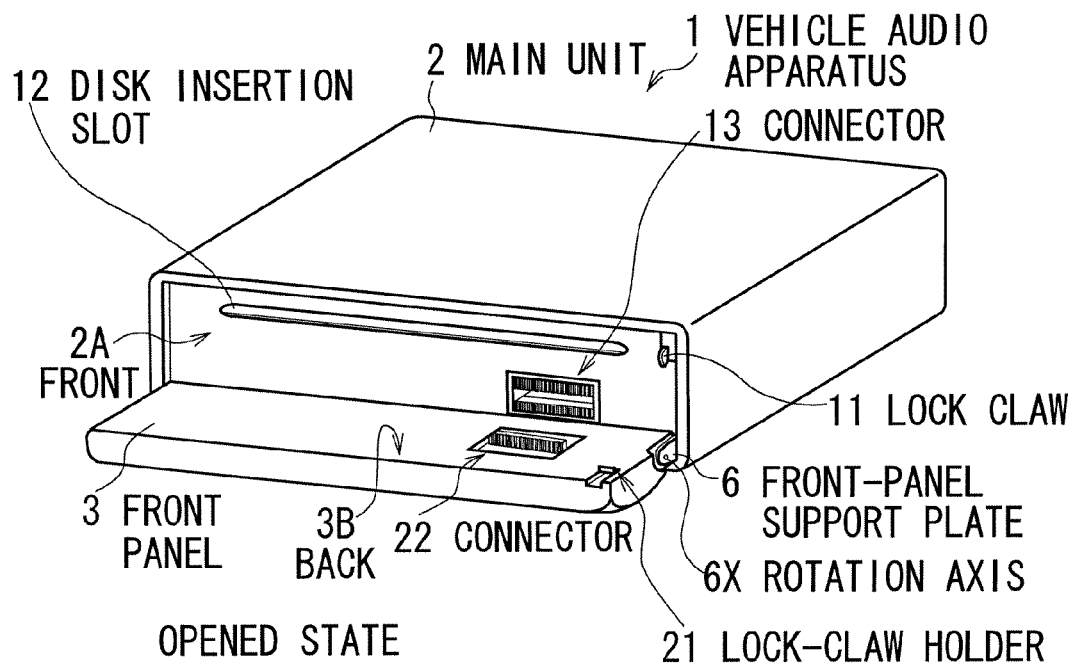

As shown in FIGS. 1A and 1B, a vehicle audio apparatus 1 includes a main unit 2 and a front panel 3. The front panel 3 is provided on the front of the main unit 2. A user may operate the front panel 3 to receive a broadcast radio program or play back a CD. The audio data acquired from the radio program or the CD is supplied to external speakers. From the audio data, the speakers generate sound, which the user may listen to.

The vehicle audio apparatus 1 is so designed that once it has been attached to a vehicle (not shown), the greater part of the main unit 2 is embedded in the dashboard and the front panel 3 is exposed at the dashboard. This is because the space in the vehicle is limited.

The vehicle audio apparatus 1 has the so-called DIN size. Thus, it has a width of about 178 mm and a height of about 50 mm.

As FIG. 1A shows, the front panel 3 has operation buttons 4 and a display unit 5 on its front 3A. The user may operate the operation buttons 4 to operate the vehicle audio apparatus 1. The display unit 5 displays various data items to the user. The front panel 3 therefore works as a so-called User Interface (UI).

The front panel 3 is rotatably supported by a rotation axis 6X, which is fastened at ends to front-panel support plates 6 protruding forwards from the main unit 2. As FIG. 1B shows, a lock claw 11 is provided on the front 2A of the main unit 2, in order to lock the front panel 3 in a closed state. On the back 3B of the front panel 3, a lock-claw holder 21 is provided to hold the lock claw 11.

Once the lock-claw holder 21 holds the lock claw 11 of the man unit 2, the front panel 3 is closed as shown in FIG. 1A, with the back 3B of the front panel 3 opposing the front 2A of the main unit 2. That is, the front panel 3 is closed, with the front 3A facing forwards. (Hereinafter, this state of the front panel 3 will be referred to as closed state.)

The front panel 3 has an open button 4A on the upper-right part. When the open button 4A is pushed down by the user, the lock-claw holder 21 releases the lock claw 11. The front panel 3 therefore rotates down and forwards around the rotation axis 6X fastened to the front-panel support plates 6. (This will be described later in detail). As a result, the front panel 3 is opened as shown in FIG. 1B, with its front 3A and back 3B facing downwards and upwards, respectively.

As shown in FIG. 1B, the front 2A of the main unit 2 has a disk insertion slot 12, through which a CD (about 120 mm across and 1.2 mm thick) can be inserted into, and removed from, the main unit 2. Since the disk insertion slot 12 is made in the front 2A of the main unit 2, the vehicle audio apparatus 1 has a high degree of design freedom in terms of the number and location of the operation buttons 4 and also in the size of the display 5.

In the front 2A of the main unit 2, a connector 13 is provided to achieve transfer of electric signals between the main unit 2 and the front panel 3. In the back 3B of the front panel 3, a connector 22 is provided to contact when the front panel 3 is rotated into the closed state.

The connector 13 and the connector 22 contact each other as long as the front panel 3 remains in the closed state as shown in FIG. 1A. Thus, the front panel 3 in the closed state is electrically connected to the main unit 2. When the front panel 3 is opened as shown in FIG. 1B, the connector 13 is electrically disconnected from the connector 22, whereby the front panel 3 is electrically disconnected from the main unit 2.

The front panel 3 may be removed from the main unit 2 and taken out of the vehicle, as long as the vehicle is parked, in order to prevent a theft of the entire vehicle audio apparatus 1. This is why the connector 13 and the connector 22 are provided so that the main unit 2 and the front panel 3 may be electrically connected and disconnected.

Thus, with the vehicle audio apparatus 1, the front panel 3 can be opened and closed with respect to the main unit 2. In the closed state, the front panel 3 is electrically connected to the main unit 2. In the opened state, the front panel 3 is electrically disconnected from the main unit 2.

(1-2) Mechanism for Opening and Closing the Front Panel

Figure 2:
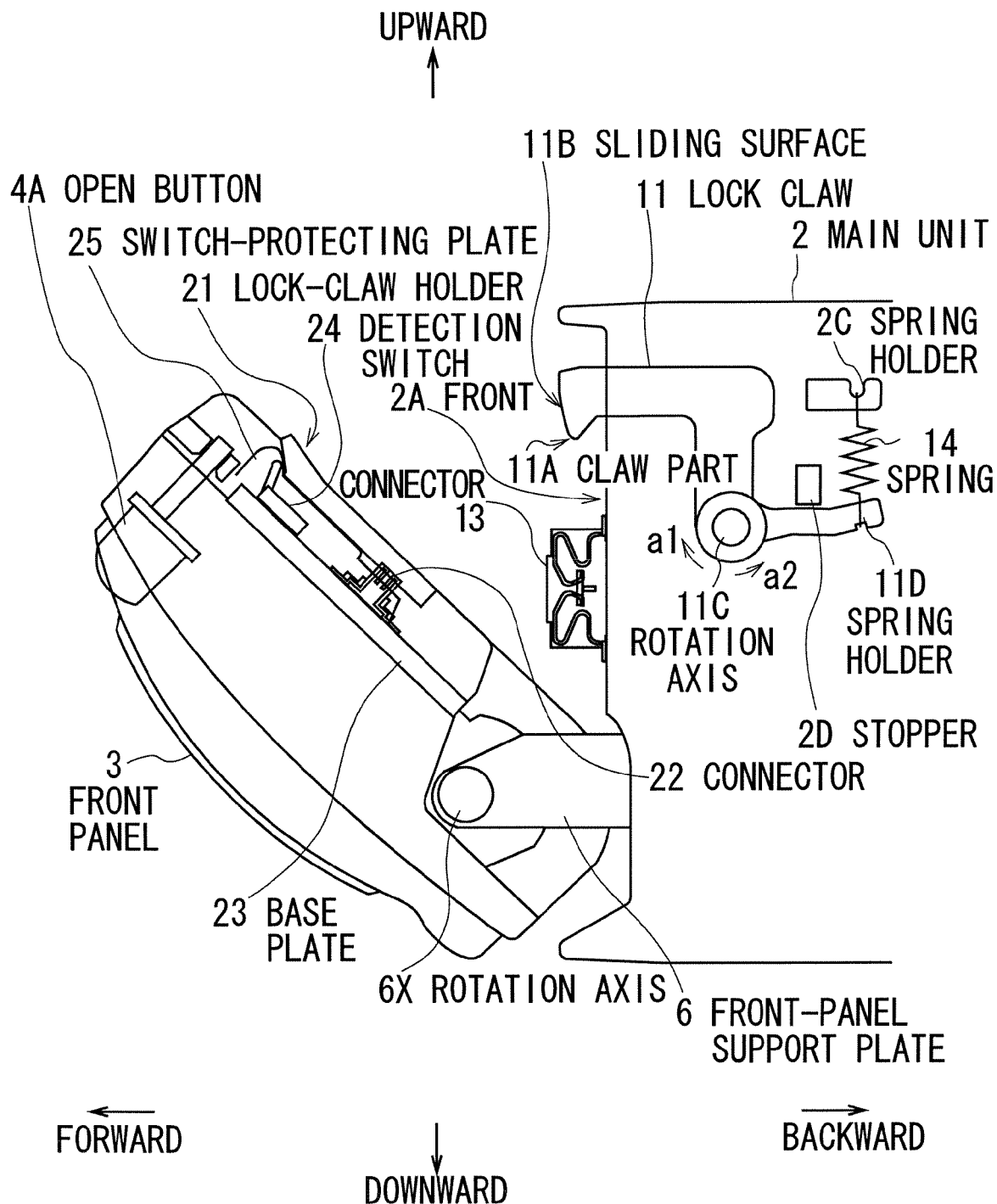
FIG. 2 is a schematic perspective view explaining the mechanism for opening and closing the front panel of the vehicle audio apparatus.

The mechanism for opening and closing the front panel 3 will be described. FIG. 2 is a side view of the front part of the vehicle audio apparatus 1, as seen from the right side. For the sake of explanation, some components are shown in FIG. 2, though they are not seen from outside.

As shown in FIG. 2, the lock claw 11 has a claw part 11A and a sliding surface 11B. The claw part 11A projects a little from the front 2A of the main unit 2. The sliding surface 11B is rounded, gradually approaching the back of the main unit 2 as it extends downwards.

The lock claw 11 can rotate around a rotation axis 11C in two directions, i.e., the direction of arrow a1 and the direction of arrow a2. The lock claw 11 has a spring holder 11D, and the main unit 2 has a spring holder 2C. A spring 14 is connected at one end to the spring holder 2C and at the other end to the spring holder 11D of the lock claw 11. The spring 14 is stretched longer than its natural length.

Hence, the resilient force (restoring force) of the spring 14 acts on the lock claw 11. The lock claw 11 is rotated around the rotation axis 11C in the direction of arrow a2, but stops rotating when a part of the lock claw 11 abuts on a stopper 2D provided in the main unit 2. That is, the lock claw 11 stops rotating in such a state as shown in FIG. 2.

Figure 3A:
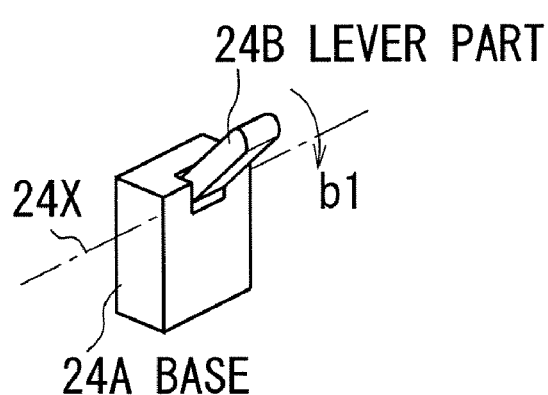
FIGS. 3A and 3B are schematic perspective views showing the configuration of a detection switch.

The front panel 3 incorporates a base plate 23, on which various electronic components are mounted. A detection switch 24 is located on the back of the base plate 23 and in the vicinity of the lock-claw holder 21. As shown in FIG. 3A, the detection switch 24 includes a base 24A and a lever part 24B.

The base 24A is shaped like a rectangular parallelepiped. The lever part 24B is shaped like a rod and protrudes from the base 24A. In the base 24A, a resilient force is generated and exerted on the lever part 24B. The lever part 24B rises up from the base 24A in normal condition.

Figure 3B:
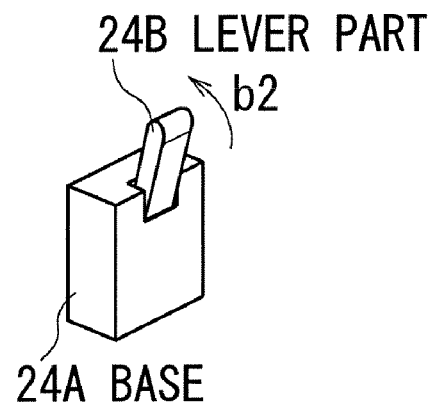

The lever part 24B can rotate around an axis 24X with respect to the base 24A. As shown in FIG. 3B, the lever part 24B rotates toward the base plate 23 when it receives a force acting in the direction of arrow b2 (FIG. 2). When the lever part 24B ceases to receive an external force, it rotates in the direction of arrow b1 as shown in FIG. 3A by virtue of a resilient force in the base 24A. As a result, the lever part 24B is set back to the normal state.

The detection switch 24 is designed to function as an electrical switch. It is off in the state shown in FIG. 3A and on in the state shown in FIG. 3B.

Figure 4A:
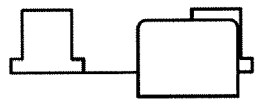
FIG. 4A is a top view of a switch-protecting plate.
Figure 4B:
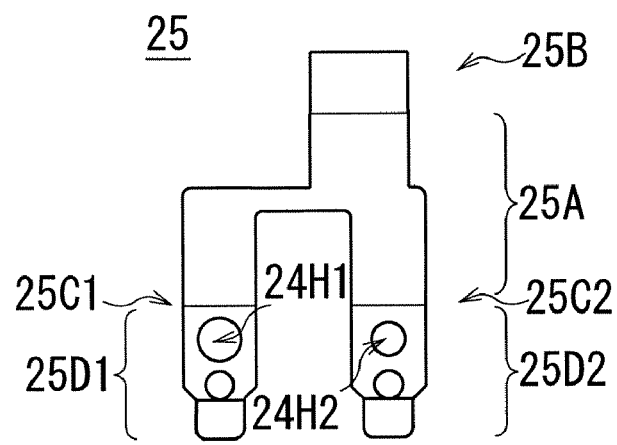
FIG. 4B is a front view of the switch-protecting plate.
Figure 4C:
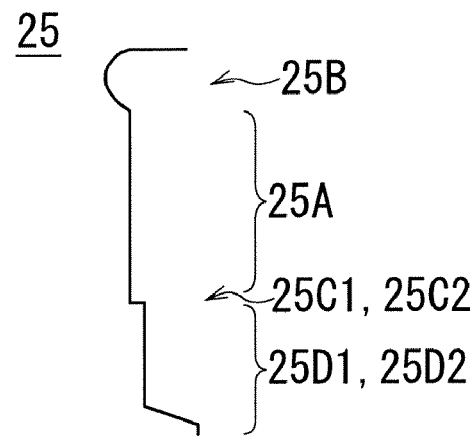
FIG. 4C is a side view of the switch-protecting plate.

The front panel 3 (FIG. 2) has a switch-protecting plate 25, which covers the detection switch 24 from back. As shown in FIGS. 4A, 4B and 4C, the switch-protecting plate 25 is a thin metal plate, is shaped like an inverted Y and is bent, assuming a prescribed shape.

The switch-protecting plate 25 has a center part 25A. That part of the plate 25, which extends up from the center part 25A, is bent like a semicircle as viewed from a side, forming a curved part 25B. The part that extends down from the center part 25A is forked into two parts. These two parts are bent a little, forming steps 25C1 and 25C2, as seen from one side.

The parts extending down from the steps 25C1 and 25C2, respectively, are greatly bent, forming leg parts 25D1 and 25D2. The leg parts 25D1 and 25D2 have two holes 24H1 and 24H2 each. The holes 24H1 and 24H2 have different radii.

The leg parts 25D1 and 25D2 are secured to the front panel 3 (FIG. 2) by using the holes 24H1 and the holes 24H2, by means of, for example, welding. Thus, the switch-protecting plate 25 is secured to the front panel 3 at two points, i.e., the leg parts 25D1 and 25D2. Hence, it is more firmly fixed than is secured to the front panel 3 at one point.

Since the switch-protecting plate 25 is secured to the front panel 3 at the leg parts 25D1 and 25D2, it can work like a leaf spring. That is, as shown in FIG. 5A and FIGS. 4A to 4C, the leg parts 25D1 and 25D2 of the switch-protecting plate 25 extend almost parallel to the center part 25A so long as no external force is applied to the switch-protecting plate 25.

Figure 5A:
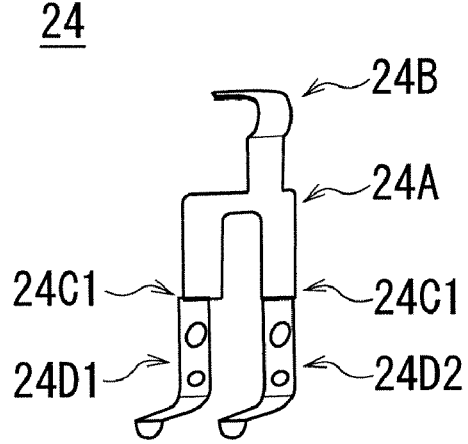
FIG. 5A is a schematic perspective view showing the configuration of a switch-protecting plate.
Figure 5B:
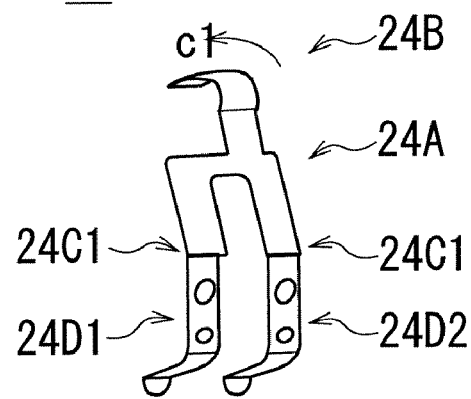
FIG. 5B is another schematic perspective view showing the configuration of the switch-protecting plate.

When an external force is applied to the curved part 25B of the switch-protecting plate 25 in the direction of arrow c1 as shown in FIG. 5B, the parts that extend up from the steps 25C1 and 25C2, i.e., the curved part 25B and the center part 25A, are pushed and bent in the direction of arrow b1. When the switch-protecting plate 25 ceases to receive the external force, it restores its initial state (FIG. 5A) because it works like a leaf spring.

Figure 6:
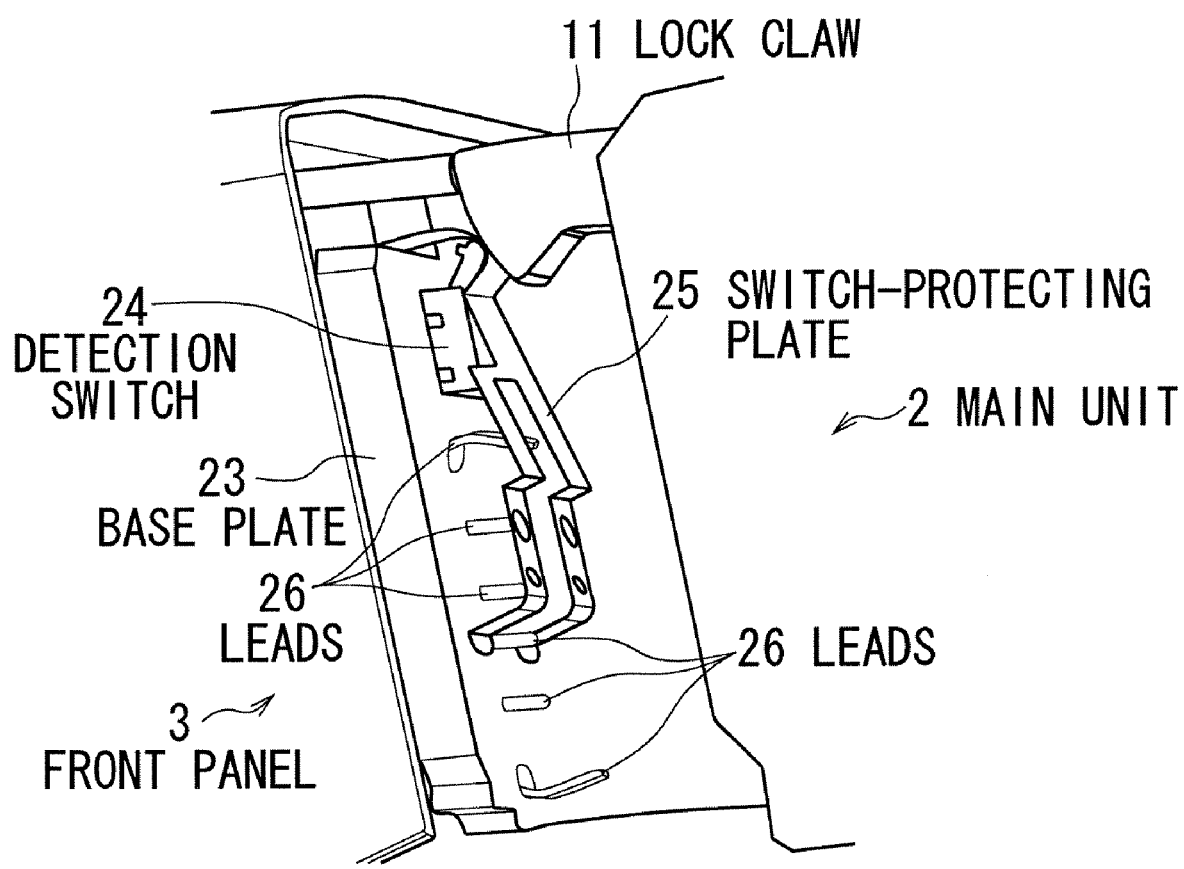
FIG. 6 is a schematic perspective view showing the detection switch in the closed state.

In fact, the claw part 11A and sliding surface 11B of the lock claw 11 push forwards the curved part 25B of the switch-protecting plate 25. Ultimately, the curved part 25B topples the lever part 24B of the detection switch 24, while the front panel 3 remains in the closed state as shown in FIG. 6. At this time, the detection switch 24 is electrically turned on, detecting that the front panel 3 is in the closed state. (This will be explained later in detail).

As described already, the switch-protecting plate 25 is forked below the center part 25A, having a step 25C1 and a leg part 25D1, on the one hand, and a step 25C2 and a leg part 25D2, on the other hand. Therefore, as shown in FIG. 6, the switch-protecting plate 25 does not interfere with leads 26 that are provided on the front of the base plate 23, which faces away from the detection switch 24.

Thus, with the vehicle audio apparatus 1, the lock claw 11 of the main unit 2 causes the switch-protecting plate 25 of the front panel 3 to topple the lever part 24B of the detection switch 24 toward the base plate 23. It is thereby detected that the front panel 3 is in the closed position.

(1-3) Configuration of the USB Socket

In addition to those components described above, a USB socket 7 is provided in the front of the front panel 3 (FIG. 1) of the vehicle audio apparatus 1. The USB socket 7 accords with the USB standards. The USB socket 7 incorporates a USB memory 50 that also accords with the USB standards.

The USB memory 50 includes a main unit 51, a nonvolatile memory, and a USB plug 52. The main unit 51 incorporates the nonvolatile memory and the USB plug 52. The USB plug 52 functions as a USB interface and accords with the USB standards. The USB memory 50 may be USB-connected to an electronic apparatus called USB host apparatus so that data may be read from the nonvolatile memory as requested by the USB host apparatus and transmitted to the USB host apparatus.

The USB standards describe the use of two power-supply lines (VBUS and GND) and two data lines (D+ and D−). Further, the USB standards define the sequence of connecting and disconnecting these lines.

Figure 7:
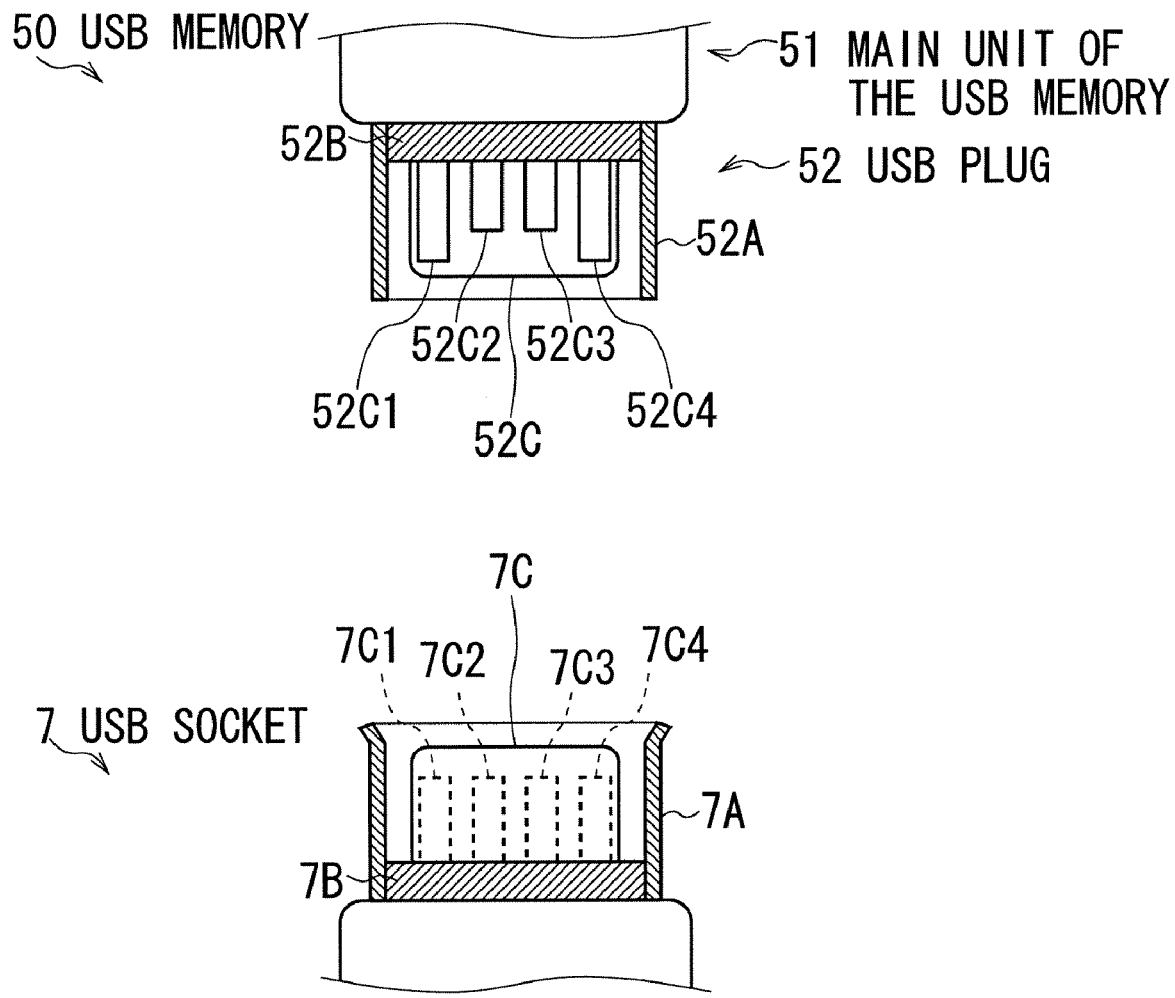
FIG. 7 is a diagram showing the configuration of a USB socket and that of a USB connector.

More specifically, as FIG. 7 shows, the USB plug 52 includes a case 52A and a terminal board 52C provided in the case 52A. Four terminals 52C1 to 52C4 are arranged on the terminal board 52C. The terminals 52C1 and 52C4 are allocated to the power-supply lines (VBUS and GND) The terminals 52C2 and 52C3 are allocated to the data lines (D+ and D−). The terminals 52C1 and 52C4 are longer than the terminals 52C2 and 52C3.

The USB socket 7 has a case 7A, which is somewhat larger than the case 52A of the USB plug 52. The case 7A contains a terminal board 7C related to the terminal board 52C. On the terminal board 7C, the terminals 7C1 to 7C4 are provided to contact the terminals 52C1 to 52C4 of the USB plug 52, respectively. Unlike the terminals 52C1 to 52C4, the terminals 7C1 to 7C4 have the same length.

Since the USB memory 50 is configured as described above, the terminals 52C1 and 52C4 contact the terminals 7C1 and 7C4, respectively, when the USB plug 52 is inserted into the USB socket 7. Power is thereby supplied to the circuits provided in the USB memory 50, activating these circuits. As the USB plug 52 is inserted deeper into the USB socket 7, the terminals 52C2 and 52C3 contact the terminals 7C2 and 7C3, respectively. The data lines in the USB memory 50 are thereby connected to the data lines in the USB socket 7. Then, data can be transferred between the USB memory 50 and the USB socket 7.

When the USB plug 52 is pulled from the USB socket 7, the terminals 52C2 and 52C3 are first disconnected from the terminals 7C2 and 7C3, whereby the data lines of the USB memory 50 are disconnected from those of the USB socket 7. Data can no longer be transferred between the USB memory 50 and the USB socket 7. The prescribed sequence of disconnecting the power supply is then performed. As the USB plug 52 is further pulled from the USB socket 7, the terminals 52C1 and 52C4 are disconnected from the terminals 7C1 and 7C4 of the USB socket 7. Power is no longer supplied to the circuits provided in the USB memory 50. As a result, the USB memory 50 stops operating.

When the data lines are disconnected, the USB memory 50 starts a prescribe sequence of disconnecting the supply of power. In other words, the data lines are not disconnected before the supply of power is stopped. Hence, the data is not destroyed in the USB memory 50 when the supply of power is suddenly stopped.

Thus, the data line are connected when the USB memory 50 is inserted into the USB socket 7 and are disconnected when the USB memory 50 is pulled out of the USB socket 7, while the power-supply lines remain connected, in the sequence of steps, which accords with the USB standards.

(1-4) Circuit Configuration of the Vehicle Audio Apparatus

The circuit configuration of the vehicle audio apparatus 1 will be described, with reference to FIG. 8. The vehicle audio apparatus 1 has a control unit 31, which controls the main unit 2 and the front panel 3.

The main unit 2 has a USB interface unit 32. The main unit 2 is connected to the front panel 3 by the connectors 13 and 22 and by two power-supply lines VBUS and GND and two data lines SD+ and SD− (corresponding to D+ and D−, respectively).

The detection switch 24 of the front panel 3 receives, at one end, power-supply voltage Vcc from the main unit 2 through a pull-up resistor R1. The other end of the detection switch 24 is connected to the ground (GND). The detection switch 24 applies the potential at its one end, as a position control signal S1, to a bi-directional switch 27.

That is, the detection switch 24 sets the control signal S1 to low level when it is turned on, and to high level when it is turned off.

In the front panel 3, two data lines (SD+ and SD−) connect the connector 22 to the USB socket 7. Two bi-directional switches 27 are provided on the two data lines, respectively.

The bi-directional switches 27 are controlled by the control signal S1. While the control signal S1 stays at high level, the switches 27 are off, disconnecting the data lines SD+ and SD−. While the control signal S1 stays at low level, the switches 27 are on, connecting the data lines SD+ and SD−.

In the front panel 3 so configured, the data lines SD+ and SD− are connected when the detection switch 24 is turned on, and are disconnected when the detection switch 24 is turned off.

The control unit 31 has a radio tuner unit and a CD player unit (either not shown). The user may operate the radio turner to receive a radio program. The user may operate the CD player unit to play back a CD. An audio signal acquired from the radio program or the CD is supplied to an audio-data processing unit 33. The control unit 31 may read music data from the USB memory 50 via the USB interface unit 32 and supplies the music data to the audio-data processing unit 33. In this case, the audio-data processing unit 33 performs a prescribed decoding process on the music data, generating an audio signal. The audio-data processing unit 33 further amplifies the audio signal, which is supplied to the speakers (not shown). The speakers generate a sound, which the user can listen to.

(2) Opening and Closing of the Front Panel and Connection of the Data Lines

It will be explained how the front panel 3 of the vehicle audio apparatus 1 is opened and closed and how the bi-directional switches 27 change the connection of the data lines SD+ and SD− as the front panel 3 is opened and closed.

(2-1) Closing of the Front Panel

The front panel 3 of the vehicle audio apparatus 1 may be closed by the user. That is, the front panel 3 in the opened state shown in FIG. 1B is closed in such a sequence as illustrated in FIG. 2.

In the vehicle audio apparatus 1, the lock claw 11 remains unlocked at time t0 as shown in FIG. 9. That is, the lock claw 11 is not locked with the lock-claw holder 21. Thus, both the detection switch 24 and the bi-directional switches 27 are off, and the connectors 13 and 22 remain disconnected from each other. That is, the data lines SD+ and SD− and the power-supply lines (VBUS and GND) are disconnected between the USB interface unit 32 (FIG. 8) provided in the main unit 2 and the USB socket 7 provided in the front panel 3.

Figure 10:
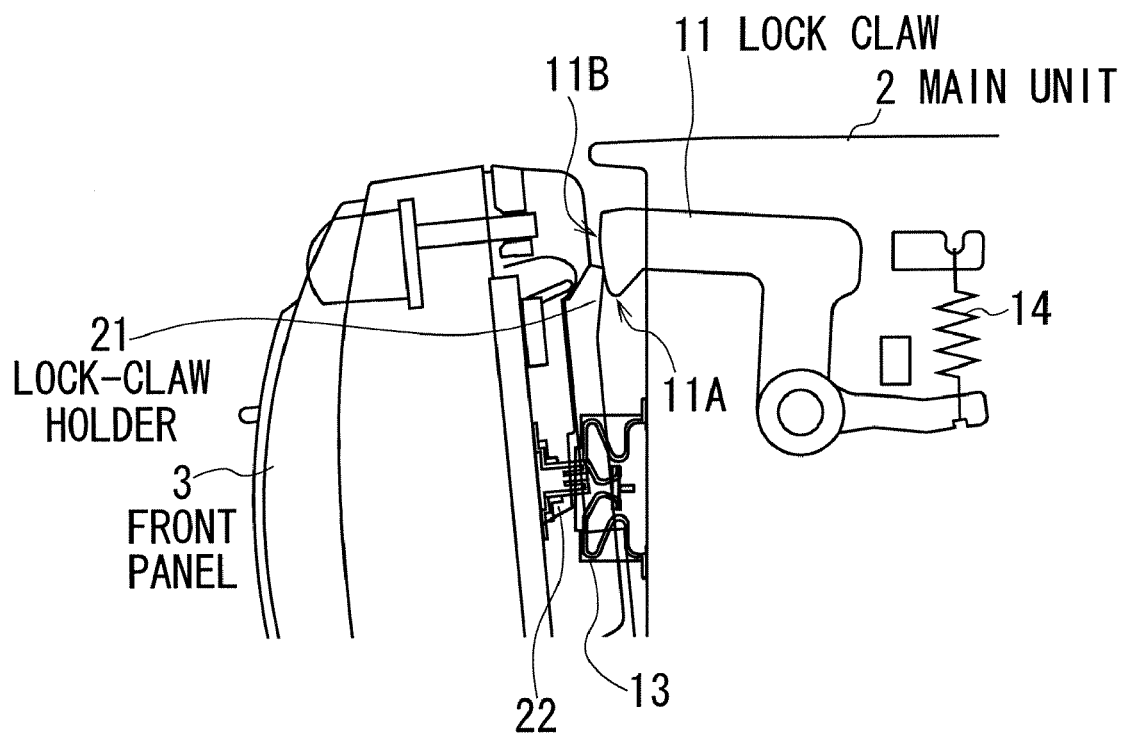
FIG. 10 is a schematic side view showing the phase (1) of closing the front panel.

In the vehicle audio apparatus 1, when the user starts closing the front panel 3, the connectors 13 and 22 contact each other as shown in FIG. 10 related to FIG. 2. The terminals of the connector 13 contact those of the connector 22 almost at the same time, because they are arranged sideways in two rows as shown in FIG. 1B and FIG. 2. At this point, the lock-claw holder 21 is in contact with the sliding surface 11B of the lock claw 11.

At this time, or at time t1 shown in FIG. 9, the connectors 13 and 22 are electrically connected in the vehicle audio apparatus 1. The power-supply lines for the USB interface unit 32 (FIG. 8) provided in the main unit 2 are thereby connected to the power-supply lines for the USB socket 7 provided in the front panel 3. However, the data lines SD+ and SD− remain disconnected.

Figure 11:
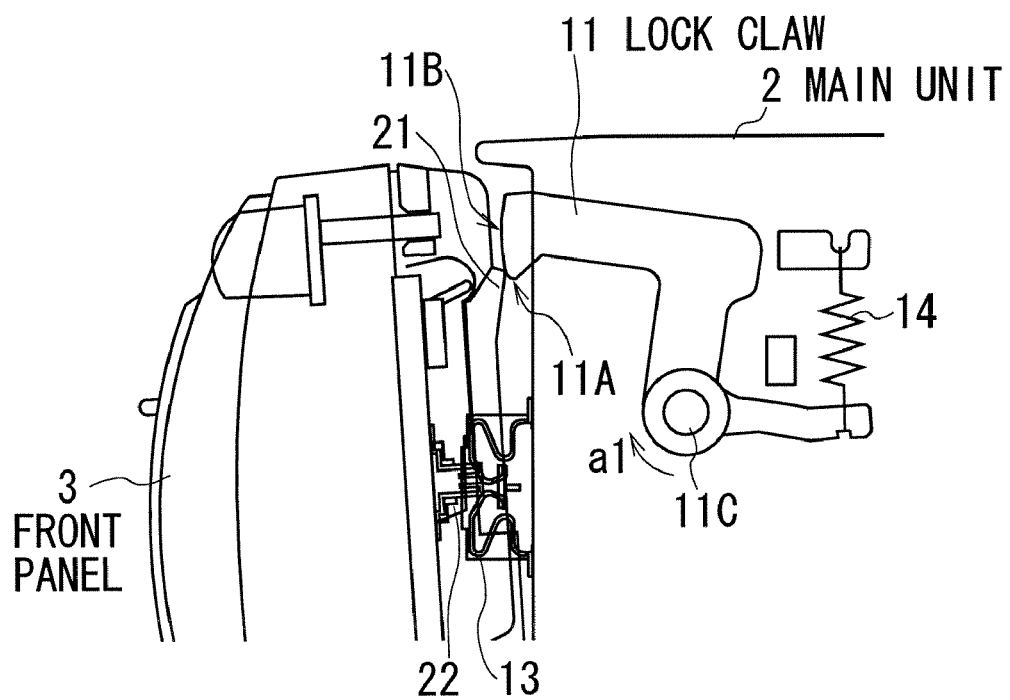
FIG. 11 is a schematic side view showing the phase (2) of closing the front panel.
Figure 12:
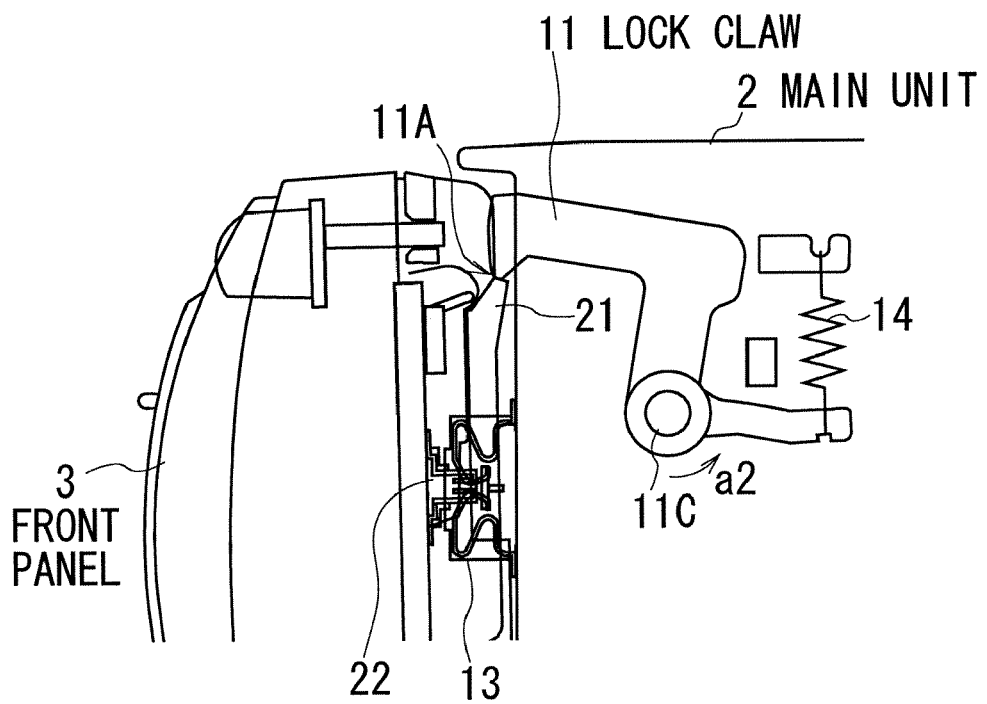
FIG. 12 is a schematic side view showing the phase (3) of closing the front panel.

As the front panel 3 is further closed in the vehicle audio apparatus 1, the lock-claw holder 21 pushes up the claw part 11A as shown in FIGS. 11 and 12, it is while sliding on the sliding surface 11B of the lock claw 11. Finally, the claw part 11A is positioned at the top of the lock-claw holder 21. At this time, the lock claw 11 is rotated around the rotation axis 11C in the direction of arrow a1. As a result, the spring 14 extends to its full length.

In the vehicle audio apparatus 1, at time t2 and time t3 shown in FIG. 9, the power-supply lines remain connected, and the data lines SD+ and SD− remain disconnected.

Figure 13:
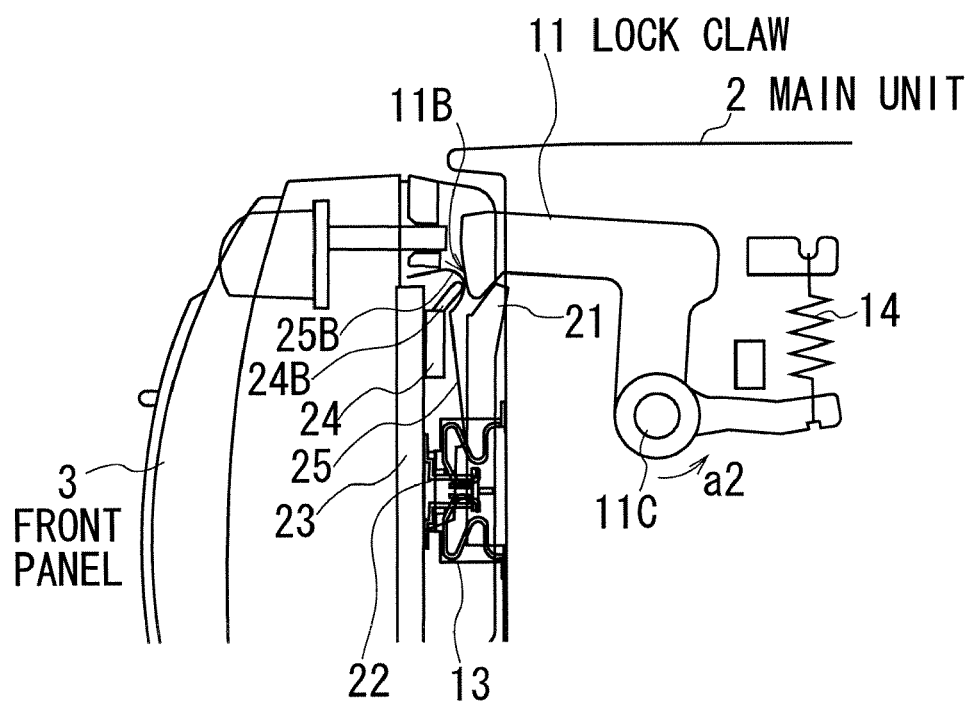
FIG. 13 is a schematic side view showing the phase (4) of closing the front panel.

In the vehicle audio apparatus 1, as the front panel 3 is closed further, the claw part 11A protrudes forwards from the lock-claw holder 21 as shown in FIG. 13. The restoring force of the spring 14 therefore rotates the lock claw 11 in the direction of arrow a2. The claw part 11A is thereby held, in part, by the lock-claw holder 21.

Further, the claw part 11A and sliding surface 11B of the lock claw 11 push the curved part 25B of the switch-protecting plate 25 forwards. As the curved part 25B is so pushed, the lever part 24B of the detection switch 24 abuts at the distal part thereof on the inner side surface of the curved part 25B. The curved part 25B topples the lever part 24B toward the base plate 23. The detection switch 24 is therefore turned on.

At this time, or at time t4 shown in FIG. 9, the bi-directional switches 27 are turned on, in interlock with the detection switch 24 in the vehicle audio apparatus 1. As a result, the data lines SD+ and SD− are connected.

Figure 14:
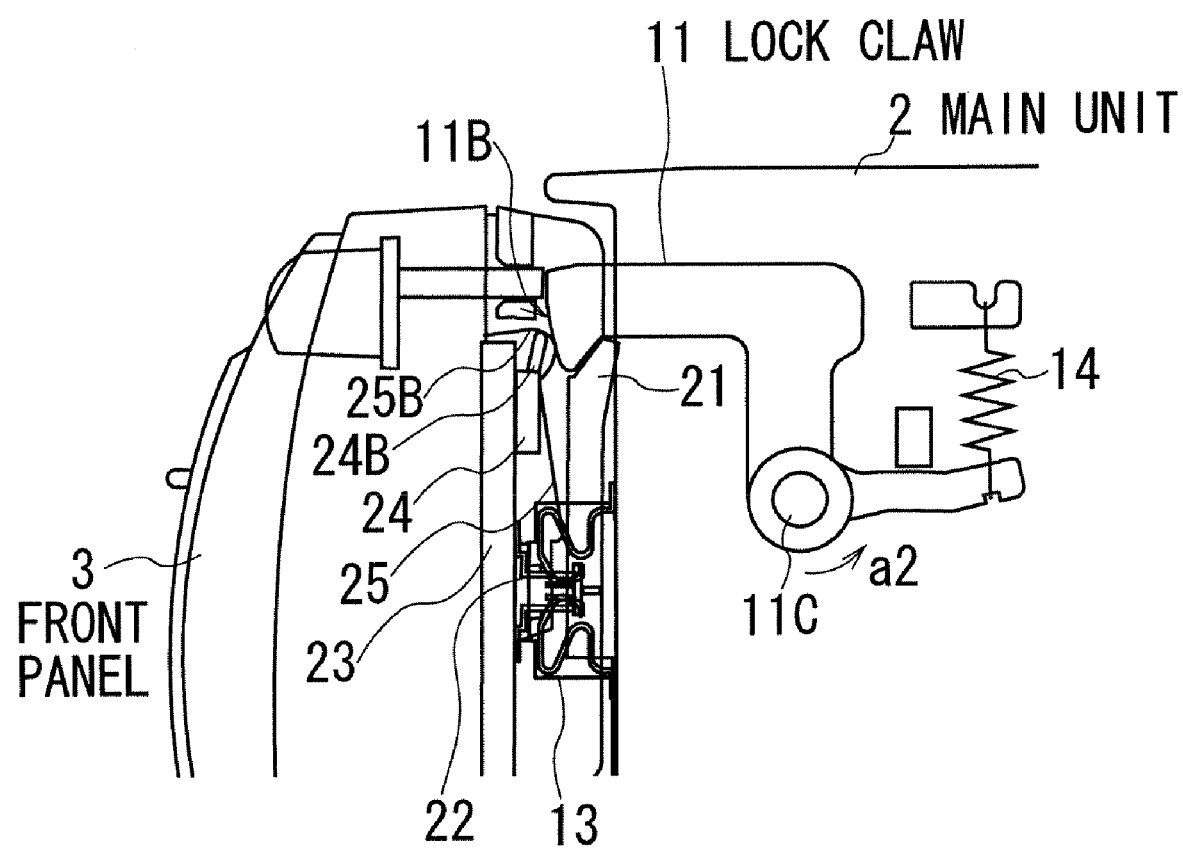
FIG. 14 is a schematic side view showing the phase (5) of closing the front panel.

When the front panel 3 is closed still further in the vehicle audio apparatus 1, the restoring force of the spring 14 further rotates the lock claw 11 in the direction of arrow a2 as shown in FIG. 14. The front panel 3 is thus completely closed. Thus, the lock claw 11 has its claw part 11A fully held in the lock-claw holder 21.

At this point, or at time t5 shown in FIG. 9, the lock claw 11 is locked, completely engaged with the lock-claw holder 21 in the vehicle audio apparatus 1.

Thus, in the vehicle audio apparatus 1, the detection switch 24 and the bi-directional switches 27 operate in interlock when the front panel 3 shifts from the opened state (FIG. 1B) to the closed state (FIG. 1A). The data lines SD+ and SD− are thereby connected after the connectors 13 and 22 have been connected. Hence, the power-supply lines are first connected and the data lines SD+ and SD− are then connected as described in the USB standards, between the USB interface unit 32 (FIG. 8) provided in the main unit 2 and the USB socket 7 provided in the front panel 3.

(2-2) Opening of the Front Panel

While the front panel 3 of the vehicle audio apparatus 1 remains closed as shown in FIG. 1A and FIG. 14, the lock claw 11 is engaged with the lock-claw holder 21 at time t10 shown in FIG. 15. Thus, the detection switch 24 and the bi-directional switches 27 are on, and the connectors 13 and 22 are connected. That is, both the data lines SD+ and SD− and the power-supply lines (VBUS and GND) are connected between the USB interface unit 32 (FIG. 8) provided in the main unit 2 and the USB socket 7 provided in the front panel 3.

Figure 16:
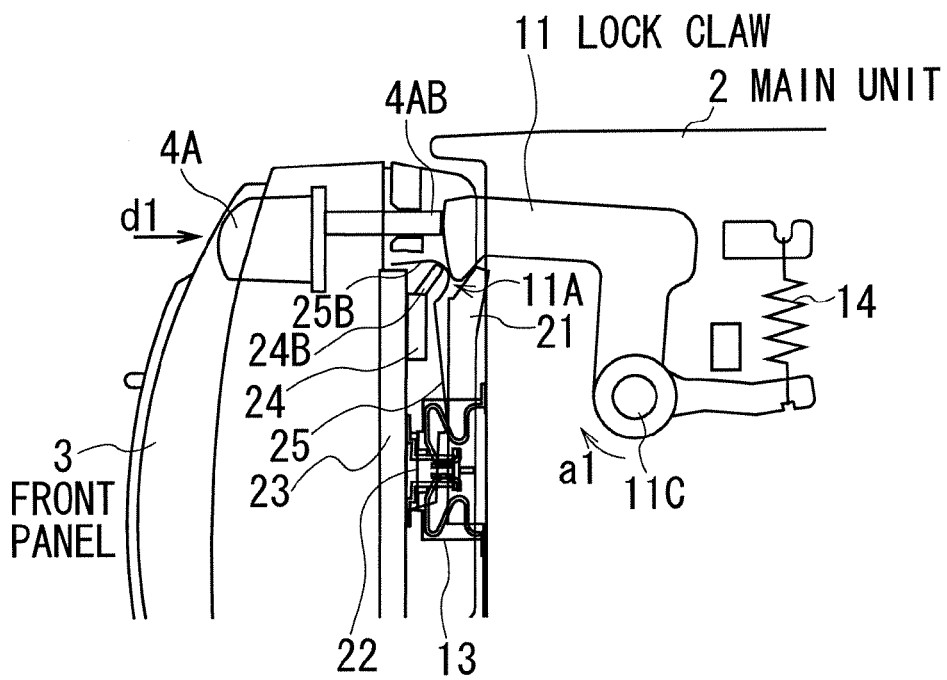
FIG. 16 is a schematic side view showing the phase (1) of opening the front panel.
Figure 17:
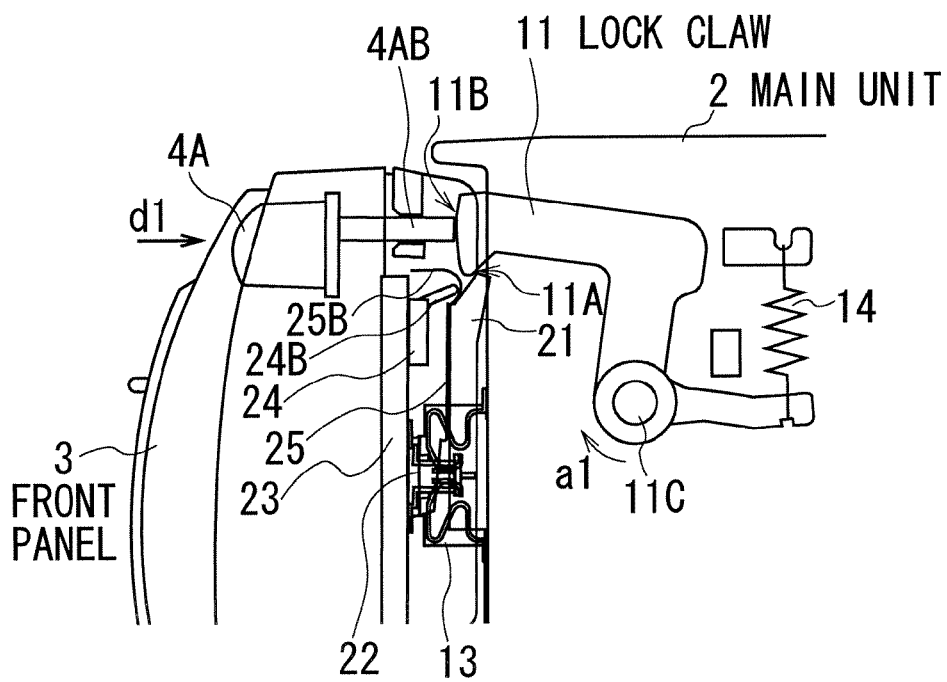
FIG. 17 is a schematic side view showing the phase (2) of opening the front panel.
Figure 18:
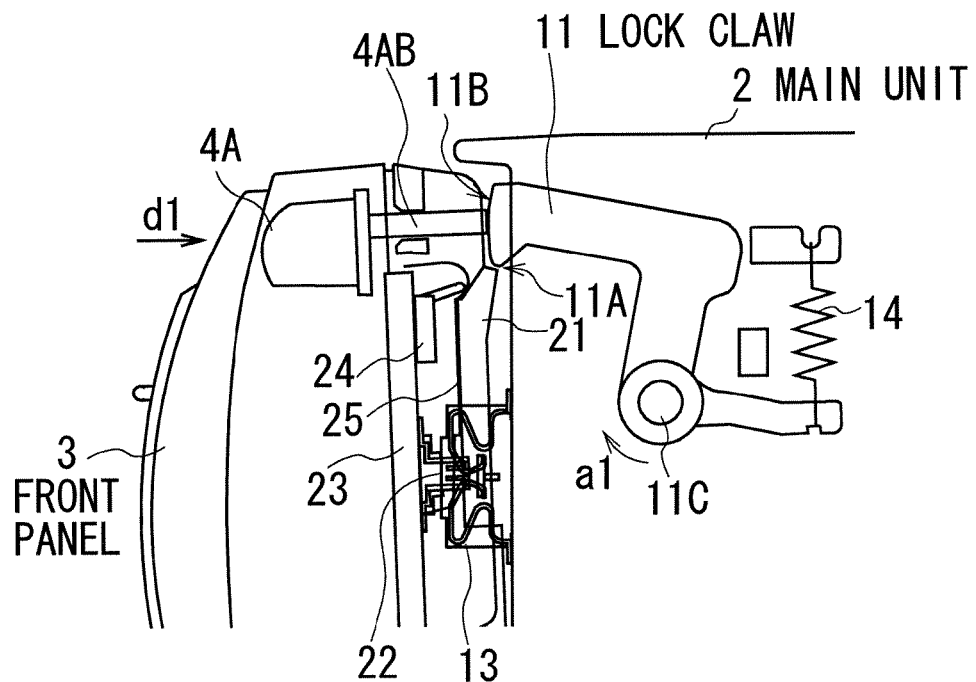
FIG. 18 is a schematic side view showing the phase (3) of opening the front panel.
Figure 19:
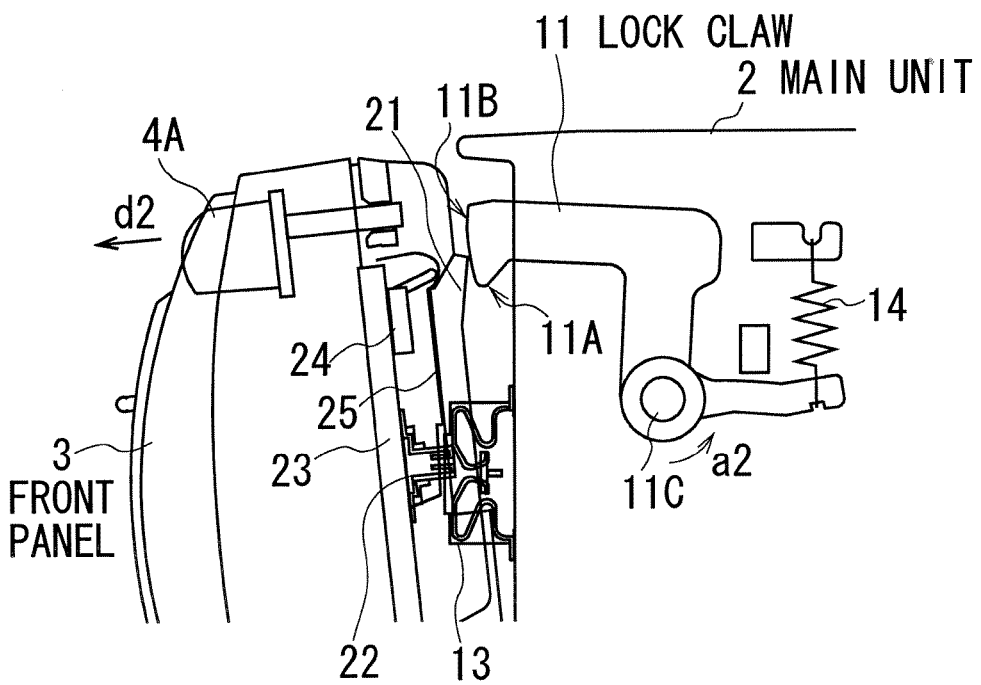
FIG. 19 is a schematic side view showing the phase (4) of opening the front panel.

In the vehicle audio apparatus 1, to open the front panel 3, the user may first depress the open button 4A in the direction of arrow d1 (that is, backwards) as illustrated in FIG. 16. As a result, a rod-like part 4AB provided at the back of the open button 4A pushes the sliding surface 11B of the lock claw 11. The lock claw 11 is thereby rotated around the rotation axis 11C in the direction of arrow a1.

The claw part 11A of the lock claw 11 is therefore lifted. As the claw part 11A, which has held the curved part 25B, is thus lifted, the switch-protecting plate 25 works as a leaf spring and develops a restoring force as it restores such a natural state as shown in FIG. 5A. The restoring force moves the curved part 25B backwards. As the curved part 25B is so moved, the lever part 24B of the detection switch 24 abuts, at its distal part, on the inner surface of the curved part 25B. Thus, the lever part 24B regains the initial state shown in FIG. 3A.

At this time, or at time t11 shown in FIG. 15, in the vehicle audio apparatus 1, the power-supply lines and the data lines SD+ and SD− are still connected between the USB interface unit 32 (FIG. 8) provided in the main unit 2 and the USB socket 7 provided in the front panel 3.

As the user further depresses the open button 4A in the direction of arrow d1, the rod-like part 4AB provided at the back of the open button 4A pushes the sliding surface 11B of the lock claw 11 further back in the vehicle audio apparatus 1. The lock claw 11 is thereby rotated around the rotation axis 11C in the direction of arrow a1.

The switch-protecting plate 25 therefore regains the natural state shown in FIG. 5A. As the plate 25 assumes the natural state again, the lever part 24B of the detection switch 24 restores its natural state shown in FIG. 3A. The detection switch 24 therefore shifts from the on state to the off state.

At this time, or at time t12 shown in FIG. 15, the bi-directional switches 27 are turned off in interlock with the detection switch 24 in the vehicle audio apparatus 1. As a result, the data lines SD+ and SD− are disconnected.

Thus, the USB memory 50, if inserted in the USB socket 7 (FIG. 1A), is regarded as will be soon removed from the vehicle audio apparatus 1, because the data lines SD+ and SD− are disconnected, while the power-supply lines remain connected. Therefore, a prescribed process of disconnecting the power-supply lines is performed.

In the vehicle audio apparatus 1, as the user further depresses the open button 4A in the direction of arrow d1, the rod-like part 4AB provided at the back of the open button 4A pushes the sliding surface 11B of the lock claw 11 back still further. The lock claw 11 is rotated around the rotation axis 11C in the direction of arrow a1. The claw part 11A of the lock claw 11 is thereby disengaged from the lock-claw holder 21.

At this point, or at time t13 shown in FIG. 15, the vehicle audio apparatus 1 assumes a lock-released state, in which the lock claw 11 is not held in the lock-claw holder 21, while the data lines SD+ and SD− remain disconnected.

Thereafter, the front panel 3 rotates forwards by its weight, gradually opening, in the vehicle audio apparatus 1. As a result, the connector 22 is disconnected from the connector 13. The connectors 13 and 22 no longer contact each other.

At this time, or at time t14 shown in FIG. 15, the power-supply lines are disconnected, too, while the data lines SD+ and SD− remain disconnected, in the vehicle audio apparatus 1.

The vehicle audio apparatus 1 has an oil damper (not shown), which is provided in the vicinity of the front-panel support plate 6 (FIG. 1). Therefore, the front panel 3 is first released from a locked state and is then slowly opened. Thus, the period between time t11 to time t14, both shown in FIG. 15, is about 15 msec, while the period between time t11 and time t12 is about 1 msec. A sufficiently long time can therefore be ensured before the power-supply lines are disconnected after the data lines SD+ and SD− are disconnected.

In the vehicle audio apparatus 1, the detection switch 24 and the bi-directional switches 27 operate in interlock when the front panel 3 shifts from the closed state (FIG. 1A) to the opened state (FIG. 1B). The data lines SD+ and SD− are thereby disconnected before the connectors 13 and 22 are disconnected. Hence, the data lines SD+ and SD− are first disconnected and the power-supply lines are then disconnected as described in the USB standards, between the USB interface unit 32 (FIG. 8) provided in the main unit 2 and the USB socket 7 provided in the front panel 3.

(3) Operation and Advantages

In the vehicle audio apparatus 1 so configured as described above, the detection switch 24 and the bi-directional switches 27 cooperate, achieving connection or disconnection between the USB interface unit 32 (FIG. 8) provided in the main unit 2 and the USB socket 7 provided in the front panel 3.

In the vehicle audio apparatus 1, the open button 4A is depressed backwards to open the front panel 3. The lock claw 11 and the lock-claw holder 21 are thereby disengaged from each other. At this point, the lock claw 11 is lifted, and the switch-protecting plate 25 therefore regains the natural state. As a result, the detection switch 24 shifts from the on state to the off state. Therefore, the data lines SD+ and SD− are first disconnected between the USB interface unit 32 (FIG. 8) provided in the main unit 2 and the USB socket 7 provided in the front panel 3. Thereafter, the power-supply lines (VBUS and GND) are disconnected when the front panel 3 is opened to disconnect the connector 22 from the connector 13.

Hence, in the vehicle audio apparatus 1, the data lines SD+ and SD− can be disconnected when the front panel 3 is opened. Thereafter, the power-supply lines are disconnected as the terminals of the connector 22 are disconnected from those of the connector 13. Therefore, the lines can be disconnected in the sequence described in the USB standards.

In the vehicle audio apparatus 1, even if the USB memory 50 remains connected to the USB socket 7, the process of disconnecting the power-supply lines can be reliably started when the data lines SD+ and SD− are disconnected. Therefore, the vehicle audio apparatus 1 is not disconnected abruptly from the power supply. This can prevent the data stored in the USB memory from being destroyed.

In the vehicle audio apparatus 1, the rotation axis 6X is arranged in a relative lower part as shown in FIG. 2, and the connectors 13 and 22 are arranged in the middle part, and the lock claw 11 and the lock-claw holder 21 are arranged in a relatively upper part. Owing to this arrangement, the front panel 3 is not opened to disconnect the connectors 13 and 22 from each other, unless the lock claw 11 is released from the lock-claw holder 21.

In the vehicle audio apparatus 1 so structured, the detection switch 24 can be turned off when the lock claw 11 is released from the lock-claw holder 21. The data lines SD+ and SD− can therefore be reliably disconnected before the connectors 13 and 22 are disconnected from each other.

In the vehicle audio apparatus 1, when the connectors 13 and 22 contact each other as the front panel 3 is closed, their terminals contact almost simultaneously. Thereafter, the lock claw 11 and the switch-protecting plate 25 turn the detection switch 24 on. The data lines SD+ and SD− can therefore be connected after the power-supply lines have been connected.

Thus, in the vehicle audio apparatus 1, the lines are connected in the sequence described in the USB standards, also when the front panel 3 is closed.

In the vehicle audio apparatus 1, the detection switch 24 is provided at a specific position. So positioned, the detection switch 24 is turned on after the connectors 13 and 22 contact each other as the front panel 3 is closed, and is turned off before the connectors 13 and 22 leave each other as the front panel 3 is opened. Owning to the use of this simple switch and the inevitable time lag between the opening and closing of the front panel 3, the lines can be connected and disconnected in the sequence described in the USB standards, without necessity of using a complex component such as a relay.

The lock claw 11 (FIG. 2) is a member that engages with the lock-claw holder 21 to keep closing the front panel 3. This is why the spring 14 exerts a relatively large force (restoring force) on the lock claw 11. On the other hand, the detection switch 24, which is incorporated in the front panel 3, is relatively small and therefore has a small strength.

In view of this, the lock claw 11 indirectly exerts a force on the detection switch 24, through the curved part 25B of the switch-protecting plate 25 in the vehicle audio apparatus 1, as is illustrated in FIGS. 10 to 14. Thus, the detection switch 24 is prevented from being broken, unlike in the case it is exerted with such a large force directly from the lock claw 11.

The curved part 25B of the switch-protecting plate 25 is bent like a semicircle, as viewed from the side, and is as large as the claw part 11A and sliding surface 11B of the lock claw 11. Hence, in the vehicle audio apparatus 1, the curved part 25B of the switch-protecting plate 25 can convert the forward motion of the claw part 11A of the lock claw 11 to a forward motion of the lever part 24B of the detection switch 24.

Moreover, in the vehicle audio apparatus 1, the switch-protecting plate 25 prevents, for example, the lever part 24B of the detection switch 24 from being clamped between the claw part 11A of the lock claw 11 and the lock-claw holder 21. If the lever part 24B is so clamped, the detection switch 24 will not be turned on as is desired.

In the vehicle audio apparatus 1 thus configured, when the lock claw 11 is released from the lock-claw holder 21 in order to open the front panel 3, the detection switch 24 is turned off. Also the bi-directional switches 27 are thereby turned off. Therefore, the data lines SD+ and SD− are first disconnected between the USB interface unit 32 provided in the main unit 2 and the USB socket 7 provided in the front panel 3. The power-supply lines (VBUS and GND) are then disconnected when the front panel 3 is opened, thus disconnecting the connector 22 from the connector 13. This prevents the vehicle audio apparatus 1 from being abruptly disconnected from the power supply and ultimately prevents the data stored in the USB memory from being destroyed.

(4) Other Embodiments

In the embodiment described above, the detection switch 24 and the bi-directional switches 27 operate in interlock, whereby the data lines SD+ and SD− are connected or disconnected. The present invention is not limited to this configuration. Rather, any other switches may be used to connect or disconnect the data lines SD+ and SD−.

Figure 8:
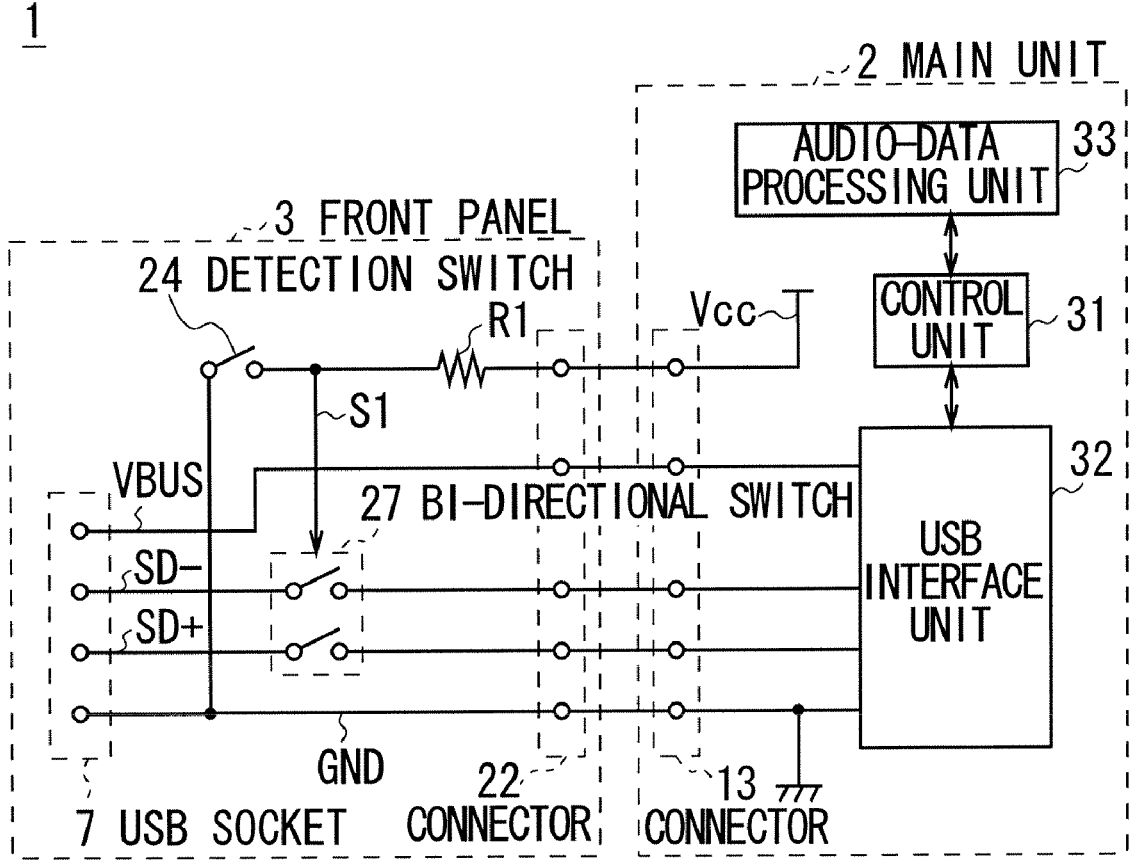
FIG. 8 is a wiring diagram showing the circuit configuration of the vehicle audio apparatus.
Figure 20:
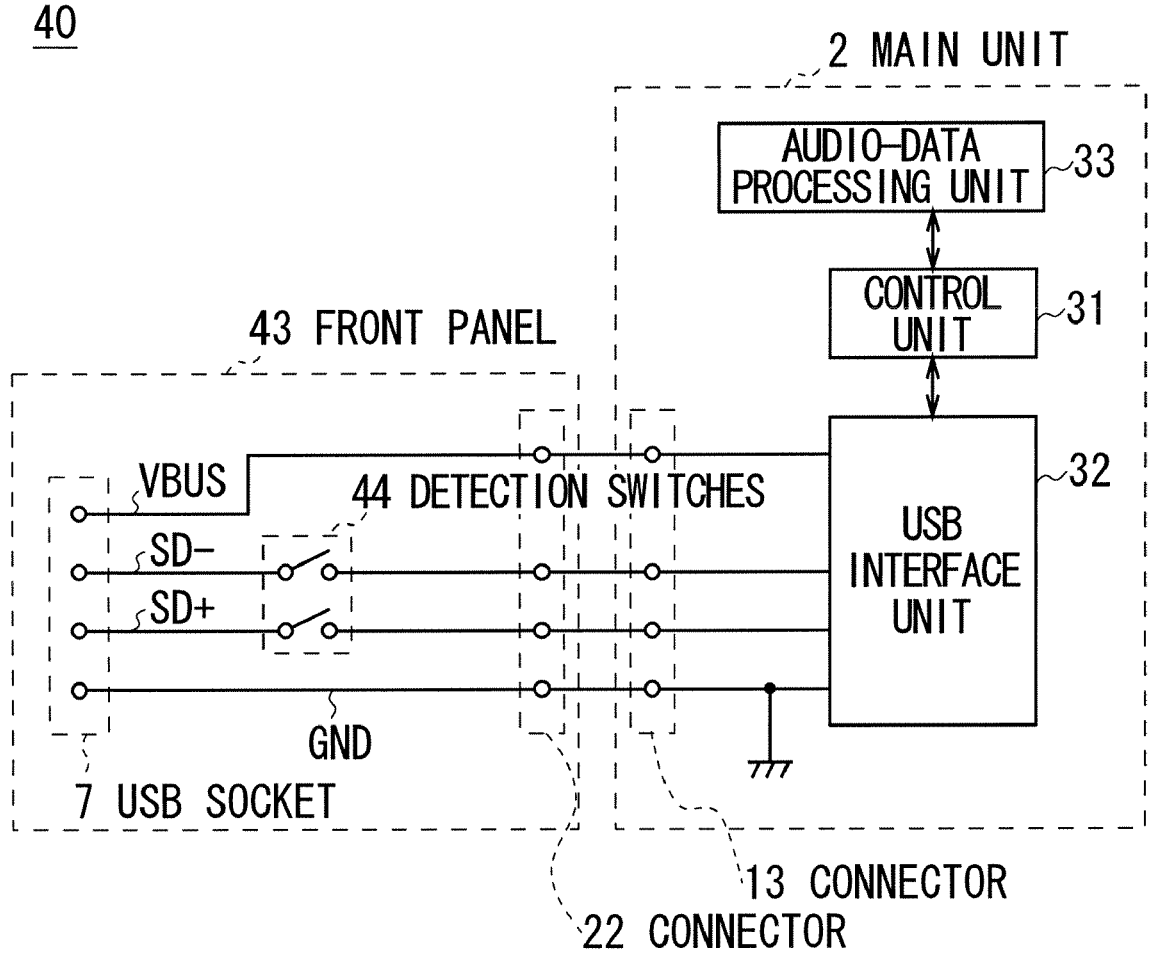
FIG. 20 is a wiring diagram showing the circuit configuration of the vehicle audio apparatus according to another embodiment of the present invention.

As shown in, for example, FIG. 20 related to FIG. 8, a two-circuit, two-contact detection switch 44 may replace the combination of the detection switch 24 and bi-directional switches 27 in the front panel 43 of the vehicle audio apparatus 1.

In the embodiment described above, the detection switch 24 and the bi-directional switches 27 are provided in the front panel 3. Nevertheless, this invention is not limited to this configuration. For example, the detection switch 24 and the bi-directional switches 27 may be provided in the main unit 2. Alternatively, the detection switch 24 and the bi-directional switches 27 may be provided in the main unit 2 and the front panel 3, respectively. Otherwise, the detection switch 24 and the bi-directional switches 27 may be arranged anywhere else in the vehicle audio apparatus 1. In any alternative case, it suffices only if the detection switch 24 is turned on or off in accordance whether the lock claw 11 is locked or not in the lock-claw holder 21.

In the embodiment described above, the lock claw 11 is provided in the main unit 2 and the lock-claw holder 21 is provided in the front panel 3. The present invention is not limited to this configuration. For example, the lock claw 11 and the lock-claw holder 21 may be provided in the front panel 3 and the main unit 2, respectively. If this is the case, it suffices to arrange the detection switch 24 and the bi-directional switches 27 in the main unit 2.

In the embodiment described above, the switch-protecting plate 25 is shaped as shown in FIGS. 4A to 4C and FIGS. 5A and 5B. This invention is not limited to this configuration. The switch-protecting plate 25 may be provided in other various shapes. In other words, the plate 25 may have any shape, so long as a force is applied to the lever part 24B of the detection switch 24 in such a way as not to break the detection switch 24. The switch-protecting plate 25 need not be made of metal; it may be made of resin or the like.

In the embodiment described above, the data lines SD+ and SD− are first disconnected and the power-supply lines are then disconnected when the front panel 3 is opened. When the front panel 3 is closed, the power-supply lines are first connected and the data lines SD+ and SD− are then connected. This invention is not limited to this configuration, nonetheless. Both the power-supply lines and the data lines SD+ and SD− may be connected at the same time when the front panel 3 is closed, though the data lines SD+ and SD− are first disconnected and the power-supply lines are then disconnected when the front panel 3 is opened.

As described above, the USB memory 50 is inserted into the USB socket 7 and is thereby connected to the vehicle audio apparatus 1. This invention is not limited to this configuration. For example, a portable hard disk drive having a USB connector or a USB-connectable portable audio player may be connected to the vehicle audio apparatus 1 via the USB socket 7. In brief, a data storage apparatus, which can read data from the apparatus 1 through a USB interface, may be connected to the vehicle audio apparatus 1.

In the embodiment described above, an oil damper is provided in the vicinity of the front-panel support plate 6 (FIG. 1) of the vehicle audio apparatus 1, and the front panel 3 is slowly opened after it has been unlocked. Nonetheless, the present invention is not limited to this configuration. For example, the front panel 3 may be opened, driven by a motor. Alternatively, the oil damper may be used in combination with a spring. Still alternatively, the front panel 3 may open by its weight, without using oil dampers at all.

In the embodiment described above, the front panel 3 of the vehicle audio apparatus 1 has a USB socket 7 that accords with the USB standards. The present invention is not limited to this configuration, nevertheless. The USB socket 7 may be replaced by, for example, a 6-pin socket that accords with the IEEE (Institute of Electrical and Electronics Engineers) 1394-1995/2000 standards. Via the 6-pin socket, which has both power-supply lines and data lines, power can be supplied to an external data storage apparatus so that data can be read from the external data storage apparatus.

Further, the embodiment described above applies the present invention to a vehicle audio apparatus 1. This invention is not limited to a vehicle audio apparatus. For example, the present invention may be applied to various electronic apparatuses, such as DVD (Digital Versatile Disc) recorders, which have a front panel which has a USB socket and which is electrically disconnected from the main unit when it is opened.

The vehicle audio apparatus 1 according to the embodiment described above includes the front panel 3 used as opening/closing unit, the lock claw 11 used as movable locking member, the connector 13 used as main-unit terminals, the connector 22 used as opening/closing-unit terminals, the USB socket 7 used as external-apparatus socket, the switch-protecting plate 25 used as interlock member, and the detection switch 24 and bi-directional switches 27 used as data-communications switches. The present invention is not limited to this configuration, nevertheless. Instead, a vehicle audio apparatus according to the embodiment of the present invention may include an opening/closing unit composed of circuits of any other types, a movable locking member of any other type, main-unit terminals of any other type, opening/closing-unit terminals of any other type, an external-apparatus socket of any other type, an interlock member of any other type, and data-communications switches of any other types.

Moreover, the present invention can be applied to a vehicle audio apparatus and the like, which has, for example, an opening/closing front panel.

It should be understood by those skilled in the art that various modifications, combinations, sub-combinations and alterations may occur depending on design requirements and other factors insofar as they are within the scope of the appended claims or the equivalents thereof.

What is claimed is:

1. A data protecting apparatus comprising:
an opening/closing unit that assumes a closed state or an opened state when rotated around a predetermined axis with respect to a main unit, the opening/closing unit being secured to the main unit while remaining in the closed state and being released from the main unit while remaining in the opened state;
a movable locking member that is moved with respect to the main unit or the opening/closing unit, and locks the opening/closing unit to the main unit, thereby setting the opening/closing unit in the closed state, or releases the opening/closing unit from the main unit, thereby setting the opening/closing unit in the opened state;
main-unit terminals that are provided in the main unit, for electrically connecting the main unit to the opening/closing unit;
opening/closing-unit terminals that are provided in the opening/closing unit, to be electrically connected to the main-unit terminals while the opening/closing unit remains in the closed state, and to be electrically disconnected from the main-unit terminals while the opening/closing unit remains in the opened state;

an external-apparatus socket that is provided in the opening/closing unit, for supplying power and transmitting data to an external apparatus while the external apparatus remains connected to the external-apparatus socket;

an interlock member that operates when the movable locking member is moved; and data-communications switches that electrically disconnect data-communications lines before electrically disconnecting power-supply lines connecting the external-apparatus socket to the main unit, by disconnecting the opening/closing-unit terminals from the main-unit terminals when the opening/closing unit is detected to be shifting from the closed state to the opened state as the interlock member operates in interlock with the movable locking member.

2. The data protecting apparatus according to claim 1, wherein the interlock member prevents the movable locking member from applying forces that move detecting elements of the data-communications switches, exclusively in a direction in which the elements are able to move.

3. The data protecting apparatus according to claim 2, wherein the interlock member has a part which abuts on the movable locking member and which is a plate-like resilient member curved like an arc as viewed from a side.

4. The data protecting apparatus according to claim 1, wherein the movable locking member is positioned farther from the predetermined axis than the main-unit terminals or the opening/closing-unit terminals.

5. The data protecting apparatus according to claim 1, wherein the data-communications switches electrically connect the data-communication lines after the power-supply lines are connected between the main unit and the external-apparatus socket as the opening/closing-unit terminals are connected to the main-unit terminals when the opening/closing unit is detected to be shifting from the opened state to the closed state as the interlock member operates in interlock with the movable locking member.

6. The data protecting apparatus according to claim 1, wherein the external-apparatus socket finishes supplying power after data communication is terminated as the external apparatus is disconnected.

7. The data protecting apparatus according to claim 1, wherein the main-unit terminals and the opening/closing-unit terminals are electrically disconnected substantially at the same time when the opening/closing unit shifts from the closed state to the opened state.

8. A data protecting method for use in an electronic apparatus which includes an opening/closing unit configured to rotate around a predetermined axis with respect to the main unit, main-unit terminals provided in a main unit, and opening/closing-unit terminals provided in the opening/closing unit and arranged in association with the main-unit terminals, respectively, and in which the main-unit terminals and the opening/closing-unit terminals electrically connect or disconnect the opening/closing unit or from the main unit, the method comprising:

a detecting step of detecting that a predetermined movable locking member has been moved to shift the opening/closing unit shift from a closed state in the which the opening/closing unit is secured to the main unit, to an opened state in which the opening/closing unit is released from the main unit, in accordance with a motion of an interlock member that operates when the movable locking member is moved; and a data-communication terminating step of electrically disconnecting data-communications lines, prior to power-supply lines, from a external-apparatus socket provided in the opening-closing unit to connect an external apparatus to the main unit, in accordance with a result of detection performed in the detecting step, before the main-unit terminals and the opening/closing-unit terminals are disconnected, the data-communications lines and the power-supply lines being connected to the main unit by the main-unit terminals and the opening/closing-unit terminals.

* * * * *